United States Patent

[11] 3,624,837

| [72] | Inventor | Scato Albarda<br>Emmasingel, Eindhoven, Netherlands |
|------|----------|------------------------------------------------------|
| [21] | Appl. No. | 806,193 |
| [22] | Filed | Mar. 11, 1969 |
| [45] | Patented | Nov. 30, 1971 |
| [73] | Assignee | U.S. Philips Corporation<br>New York, N.Y. |
| [32] | Priority | Mar. 16, 1968 |
| [33] | | Netherlands |
| [31] | | 6803778 |

[54] MOTOR SPEED AND TORQUE CONTROL CIRCUIT WITH E.M.F. FEEDBACK
14 Claims, 8 Drawing Figs.

[52] U.S. Cl. .................................................... 318/331,
318/341, 318/434
[51] Int. Cl. ..................................................... H02p 5/06
[50] Field of Search ............................................ 318/331,
434, 308, 332, 257, 327, 341

[56] References Cited
UNITED STATES PATENTS

| 3,257,597 | 6/1966 | Weiser .......................... | 318/344 |
| 3,127,550 | 3/1964 | Gilbreath et al. ............. | 318/331 |
| 3,214,666 | 10/1965 | Clerc ............................ | 318/331 X |
| 3,398,345 | 8/1968 | James ........................... | 318/341 |

Primary Examiner—Oris L. Rader
Assistant Examiner—Robert J. Hickey
Attorney—Frank R. Trifari

ABSTRACT: A motor speed control circuit that includes an SCR in series with the motor across a source of AC supply voltage. A control circuit controls the SCR firing angle so that the effective current applied to the motor is substantially independent of the motor back e.m.f. The SCR control circuit includes a timing circuit that produces a time variable ignition pulse for controlling the SCR firing angle. The reference point for the timing circuit is that instant when the motor back e.m.f. equals the voltage of the trailing edge of the forward half cycle of the AC supply voltage. This choice of the reference point causes the SCR control circuit to advance the ignition of the SCR when the back e.m.f. increases, whereas prior art circuits delay the SCR ignition for increased back e.m.f. However, the overall conduction angle of the SCR remains approximately constant by virtue of a reset switch that resets the timing circuit at the aforesaid reference point. Thus, the effective motor current stays approximately constant within given limits.

fig.1 fig.2 fig.3 fig.4 fig.5 fig.6 fig. 7 fig.8

MOTOR SPEED AND TORQUE CONTROL CIRCUIT WITH E.M.F. FEEDBACK

The present invention relates to an arrangement for controlling the direct current supplied from an alternating-voltage source to a load across which it produces a reverse voltage. More particularly, the invention relates to a phase-control arrangement utilizing at least one controlled rectifier which is ignited during each forward half-cycle of the supply voltage with a controlled delay with respect to a reference instant at which the absolute value of the reverse voltage or of a voltage proportional thereto is equal to the instantaneous amplitude of the trailing edge of a half-cycle of the supply voltage or of a voltage proportional thereto.

Such an arrangement is known from French Pat. No. 1,355,583. It is hereby achieved that within certain limits the effective current applied to the load is substantially independent of the reverse voltage produced across said load.

This may be desirable when charging an accumulator, or feeding a load shunted by a capacitor of comparatively high capacitance, or a DC motor, for example, a servomotor. In this last case the arrangement is useful where a substantially constant driving, braking and/or holding torque is desired rather than a constant speed. A current limiting action is then automatically obtained so that special current-limiting steps need not be taken.

The invention has for an object to provide a particularly advantageous, versatile arrangement of the kind defined in the preamble which can be readily adapted to a great variety of purposes, and more particularly to the supply and control of a DC servomotor.

The arrangement according to the invention is characterized in that it comprises a time-measuring circuit, known in itself from U.S. Pat. No. 3,257,597, having a reset switch and which produces a pulse for igniting a corresponding controlled rectifier with a time delay after the reference instant determined by the time-measuring circuit. The arrangement further comprises a comparison circuit to which the difference between the supply voltage and the reverse voltage is applied and which includes a voltage difference limiter followed by a differentiating circuit, and which produces pulses at each passage of the supply voltage through the value of the reverse voltage. The reset switch is controlled by the pulses derived from the differentiating circuit and is sensitive solely to control signals of a given polarity corresponding to that of the reset pulses corresponding to the reference instant.

It should be noted here that voltage difference limiters and differentiating circuits are known per se, for example, from US. Pat. No. 3,193,753.

The invention will now be described more fully with reference to the drawing in which.

Figure 1:
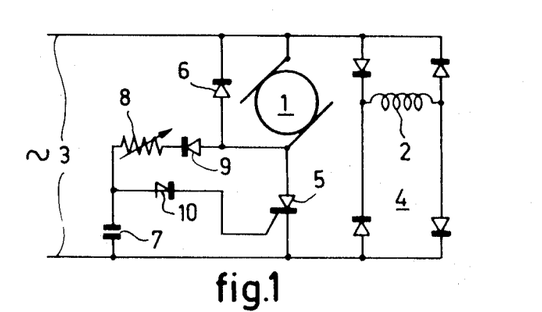
FIG. 1 shows the circuit diagram of a known arrangement for controlling the speed of rotation of the rotor of a commutator motor.

FIG. 1 shows the circuit diagram of a known arrangement for controlling the speed of rotation of the rotor 1 of a direct current or commutator motor having an energizing winding 2 energized by an alternating voltage source 3 through a rectifier bridge 4 comprising four diodes. As far as the arrangement is concerned, the motor could as well be energized by a permanent magnet.

The rotor 1 is connected to the alternating voltage source through a controlled rectifier 5 and is shunted by a diode 6. This diode passes a current which is produced at the end of each forward half-cycle of the alternating voltage (upon the extinction of the controlled rectifier 5) by the magnetic energy stored in the inductance of the rotor 1. Thus, the diode suppresses the sharp reverse voltage pulse produced across the rotor 1 by the interruption of the supply current through its inductance.

The control circuit of the controlled rectifier 5 includes a capacitor 7 which is connected on the one hand to the source 3 and to the cathode of the controlled rectifier 5 and on the other hand through the series combination of a variable charging resistor 8 and a diode 9 to the anodes of the controlled rectifier 5 and the diode 6 and to the corresponding terminal of the rotor 1. Furthermore, the junction of this capacitor with its charging resistor 8 is connected to the control electrode of the controlled rectifier 5 through a connecting element having a voltage threshold above which breakdown of this element occurs, for example, through a four-layer diode 10.

Let it be assumed that the rotor 1 is stationary and that the energizing field is produced by the conventional winding 2. At the instant $t_0$ at the beginning of the first forward half-cycle of the supply voltage, the capacitor 7 is charged by this voltage through the rotor 1, the diode 9 and the charging resistor 8 in accordance with the charging curve $V_7$ of the left-hand diagram of FIG. 2, the voltage drop across the rotor 1 being negligibly small.

Figure 2:
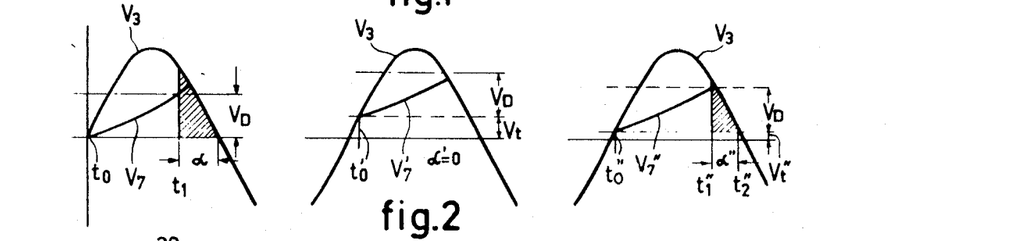
FIG. 2 shows voltage-time diagrams for explaining the operation of this known arrangement.

At the instant $t_1$ at which the voltage $V_7$ exceeds a threshold value $V_D$ equal to the sum of the threshold voltage of the diode 10 and of the control electrode-cathode path of the controlled rectifier 5, the diode 10 breaks down. The capacitor 7 is then discharged through this diode and the control electrode-cathode path of the controlled rectifier 5 and ignites this rectifier with a delay time $\Delta t = t_1 - t_0$ with respect to the reference instant $t_0$. The rotor 1 is then supplied with a current pulse having a duration corresponding to the angle $\alpha$, whereupon the supply voltage passes through the value zero and the controlled rectifier 5 extinguishes again.

Let it be assumed that the rotor 1 rotates at the speed adjusted by means of the resistor 8 and that its speed has been slightly increased during a preceding forward half-cycle of the supply voltage. After the circulation current through the rotor 1 and the diode 6 during the reverse half-cycle of the supply voltage has gradually fallen to zero, a counter e.m.f. $V_t$ appears across the rotor 1 which is produced by the rotation of the rotor winding in the energizing field and is substantially proportional to the speed of rotation of this rotor. During the subsequent forward half-cycle, the capacitor 7 is charged by the difference between the supply voltage $V_3$ and the counter e.m.f. $V_t$, as represented by the central diagram of FIG. 2. Thus, this capacitor begins to charge at a later point in the supply voltage waveform, e.g. at a reference instant $t_0'$. The capacitor charges in accordance with a curve $V'_7$ which is less steep than the curve $V_7$ because the charging voltage $V_3 - V_t$ is smaller than the supply voltage $V_3$. As a result, its voltage $V'_7$ starts to decrease again at a value of the voltage $V_3$ which is lower than the value of the threshold voltage $V_D$ so that during the relevant half-cycle the controlled rectifier is not ignited at all.

Since no energy is supplied to the rotor 1, its speed of rotation decreases again. During a subsequent forward half-cycle of the supply voltage, the counter e.m.f. $V_t$ has therefore decreased so that the capacitor 7 begins to charge at an earlier reference instant $t''_0$, as represented by the right-hand diagram of FIG. 2. Its charging curve $V''_7$ is now slightly steeper than the curve $V'_7$ so that its voltage reaches the value $V_D$ of the threshold voltage just at the instant $t''_1$ and then decreases again. The capacitor 7 is thus discharged through the diode 10 and the control electrode-cathode path of the controlled rectifier 5 and ignites this rectifier at the instant $t''_1$.

The controlled rectifier 5 extinguishes again at the instant $t''_2$ at which the supply voltage $V_3$ passes through the value $V''_t$ of the counter e.m.f. so that the rotor is supplied with a current pulse of short duration, $\alpha''=t''_2-t''_1$ and of smaller amplitude.

By means of this circuit arrangement and by most of the known circuit arrangements in which the supply of a load is controlled by means of a reverse voltage produced across the load or by a voltage proportional thereto such as, for example, the voltage produced by a tachometer generator driven by a controlled motor, the counter e.m.f. produced across the load is controlled and/or stabilized. The supply arrangement comprising the alternating voltage source, the controlled rectifier or rectifiers and the associated control circuit thus has the character of a voltage source of more or less constant voltage according as the conduction angle ($\alpha$ and $\alpha''$ respectively) remains within the linear range of the relevant half-cycle, i.e., the range in which $\sin(\pi-t_1)\approx\pi-t_1$, limited approximately to $\pi > t_1 > \frac{2}{3}$.

A disadvantage of this method is that when the impedance of the load and/or the reverse voltage produced across the load decreases, for example, when the rotor 1 of the motor of FIG. 1 is blocked, the controlled rectifier is ignited at an earlier instant, which in certain cases gives rise to inadmissibly high currents. In practice, this often involves the necessity of providing means for protection from excess currents obtained, for example, by providing safety fuses, by an automatic switching-off device or by means of a separate protecting control circuit for the controlled rectifier or each of the controlled rectifiers.

In certain cases, however, the effective current applied to the load should be constant and independent, at least within certain limits, of the reverse voltage produced across the load.

Figure 3:
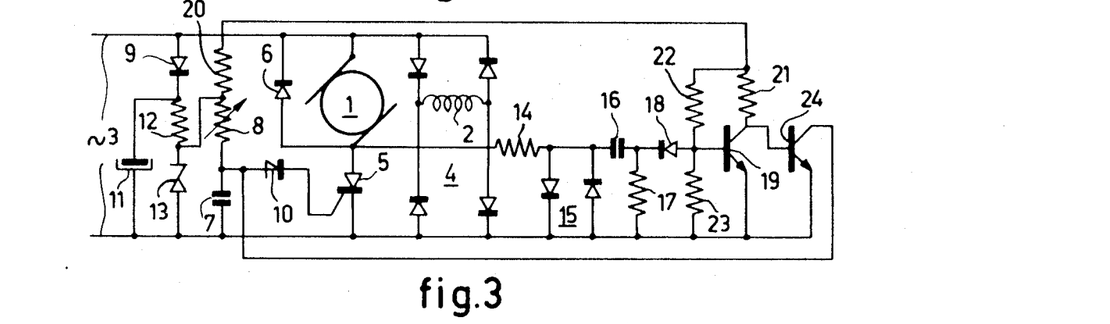
FIG. 3 shows the circuit diagram of an embodiment of the arrangement according to the invention which is analogous to the arrangement of FIG. 1 and by means of which the torque of a commutator motor can be controlled.

FIG. 3 shows the circuit diagram of a first comparatively simple embodiment of an arrangement according to the invention to be used in such a case, i.e., for controlling a DC motor acting as a servomotor so that a substantially constant driving torque is obtained.

In this Figure, elements corresponding to those of FIG. 1 are designated by the same reference numerals. Except for the control circuit for the controlled rectifier 5, the arrangement shown also corresponds to that of FIG. 1.

The anode of the diode 9 is connected, not through the rotor 1, but directly to the terminal of the supply voltage source 3 connected to said rotor. Its cathode is connected to the positive terminal of an electrolytic capacitor 11 and through a resistor 12 to the N-electrode of a Zener diode 13. The negative terminal of the capacitor 11 and the P-electrode of the Zener diode 13 are connected to the other terminal of the source 3 and to the cathode of the controlled rectifier 5. The Zener diode 13 thus constitutes a source of substantially constant positive voltage for the control circuit, in particular for periodically recharging the capacitor 7 through the variable resistor 8.

As in the arrangement of FIG. 1, the reference instant at which the capacitor 7 is charged depends upon the counter e.m.f. or upon the reverse voltage produced across the load. At this instant, the absolute value of the reverse voltage or of a voltage proportional thereto is equal to that of the supply voltage or of a voltage proportional thereto.

A reference instant is chosen whose phase shifts in the forward direction when the reverse voltage increases. When the reverse voltage increases, the ignition of the controlled rectifier is advanced instead of being delayed, as in the arrangement of FIG 1.

This is achieved by choosing a reference instant at which the value of the supply voltage during the preceding forward half-cycle has become smaller than the counter e.m.f produced across the rotor 1 and in that the capacitor 7 is short circuited at this reference instant. The difference between the supply voltage $V_3$ and the counter e.m.f. $V_t$ is derived from the controlled rectifier 5 and is applied through a resistor 14 to a double diode limiter 15. The trapezoidal voltage across this limiter is differentiated by means of an RC-network comprising a capacitor 16 and a resistor 17 and only the negative peaks of the voltage peaks appearing across this resistor are applied through a diode 18 to the base of an NPN-type transistor 19. The emitter of this transistor and that of a second transistor 24 are directly connected to the cathode of the controlled rectifier 5. The collector of the transistor 19 is fed with the positive direct voltage across the Zener diode 13 through a first resistor 20 and a load resistor 21. The base of transistor 19 is connected to the tapping on a potentiometer 22, 23 connected across the series-combination of the emitter-collector path of the transistor 19 and of the load resistor 21. The potentiometer is proportioned so that the transistor 19 is normally heavily conducting and can be cut off only by the negative voltage peaks of comparatively large amplitude which are produced by limitation and differentiation at the instant at which the decreasing forward voltage $V_3$ again becomes smaller than the counter e.m.f. $V_t$.

At the instants at which $V_3$ again becomes positive or larger than $V'_t$, a negative pulse also is produced by the circuit 14–17, it is true, but this pulse is of smaller amplitude because it temporarily coincides with the conductive period of the left-hand diode 15, whilst it is preceded by a positive pulse of comparatively large amplitude produced at the instant at which the right-hand diode 15 is no longer conducting.

The base of the transistor 24, which is also of the NPN-type, is directly connected to the collector of the transistor 19 and its collector is connected to the junction of the capacitor 7 and the charging resistor 8. As long as the transistor 19 is conducting, the transistor 24 remains cut off because its base-emitter path is shunted by the emitter-collector path of the heavily conducting transistor 19. During the short negative pulses applied to the base of the transistor 19, the transistor 24 becomes conducting, however, since a sufficiently large current then flows through the resistors 20 and 21 to its base. At the reference instant, the capacitor 7 is short circuited by the collector-emitter path of the transistor 24 and is discharged through this path.

Figure 4:
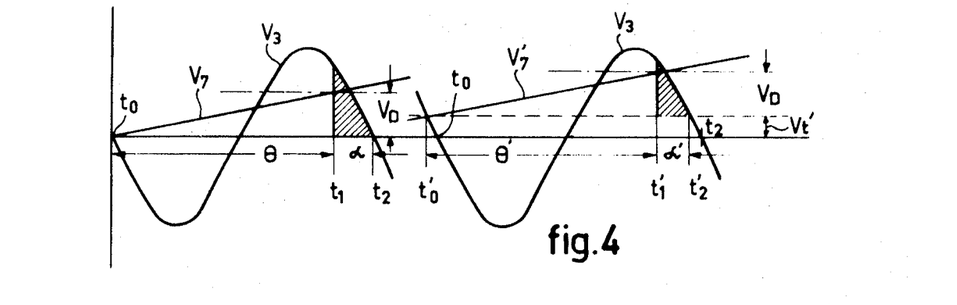
FIG. 4 shows voltage-time diagrams for explaining the operation of the embodiment of FIG. 3.

The operation of the embodiment described with reference to FIG. 3 will be more fully explained by reference to the voltage-time diagrams of FIG. 4.

At the instant $t_0$ of the left-hand diagram, the counter e.m.f. produced across the rotor 1 is still equal to zero, for example, when the motor is started. Accordingly, the reference instant also lies at $t_0$ when the decreasing supply voltage becomes negative. The capacitor 7 is charged at this instant $t_0$ in accordance with the curve $V_7$. At the instant $t_1$, an angle $\alpha$ of approximately 305° el. after the instant $t_0$, its voltage $V_7$ attains a value equal $V_D$, i.e. the sum of the threshold voltages of the diode 10 and of the control electrode-cathode path of the controlled rectifier 5. At this instant, the capacitor 7 is discharged through the diode 10 and the control electrode-cathode path of the controlled rectifier 5 and ignites this rectifier. The latter then passes a current pulse which flows during the last part of the relevant forward half-cycle of the supply voltage, i.e., during approximately 55°. The current-time integral is approximately proportional to the cross hatched voltage-time integral although it is deformed and delayed by an inductive component of the load 1,6. At a later instant $t'_0$ (right-hand diagram), the motor has already attained a given speed of rotation so that a counter e.m.f. $V'_t$ is produced across its rotor 1. The instant $t_0'$ at which the difference between the forward supply voltage $V_3$ and the counter e.m.f. $V_t'$ becomes smaller than zero is thus advanced with respect to the zero passage of the supply voltage, for example, by approximately 15°.

At this advanced instant $t_0'$, the capacitor 7 is charged by the substantially constant voltage across the Zener diode 13 in accordance with a curve $V_7'$ having the same slope as the curve $V_7$ of the left-hand diagram. The capacitor voltage $V_7$ reaches the unchanged value $V_D$ after an angle $\theta'$ equal to the angle $\theta$ so that the ignition of the controlled rectifier 5 is advanced by the same angle as the instant $t_0'$ is advanced with respect to $t_0$. However, this rectifier is extinguished at the instant $t_2'$ at which the forward supply voltage $V_3$ becomes smaller than the counter e.m.f. $V_t'$, instead of at the instant $t_2$ of the zero passage of the supply voltage. The conduction angle $\alpha'$ is thus substantially equal to the first conduction angle $\alpha$. The crosshatched voltage-time integral has become slightly smaller because the instants $t_1$ and especially $t_1'$ are now slightly too close to $t_2-\pi/2$. In particular, $t_1'$ lies at $t_2-70°$ and hence outside the linear range in which $\sin(t_2-t_1')$ is substantially equal to the angle $t_2-t_1'$, which is assumed to be approximately $t_2-60°$.

It can thus be seen that in contradistinction to the controlled rectifier 5 of the arrangement of FIG. 1, the rectifier of the arrangement of FIG. 3 will continue to be ignited during each forward cycle of the supply voltage $V_3$ as long as the amplitude of the supply voltage $V_3$ exceeds the reverse voltage $V_t$ produced across the load. Within a given range, the current-time integral of the direct current pulses applied to the load will remain substantially independent of this reverse voltage. Thus, the arrangement of FIG. 3 has the character of a current source having a high internal resistance, or with a given adjustment of the resistor 8, of a source of substantially constant current. Thus, the motor 1,2 produces a substantially constant driving torque, which for certain applications, for example, in a servo-system or in winding arrangements, is often desirable. Moreover, it is no longer required to provide a separate protection device for limiting the current applied to the rotor 1.

Figure 5:
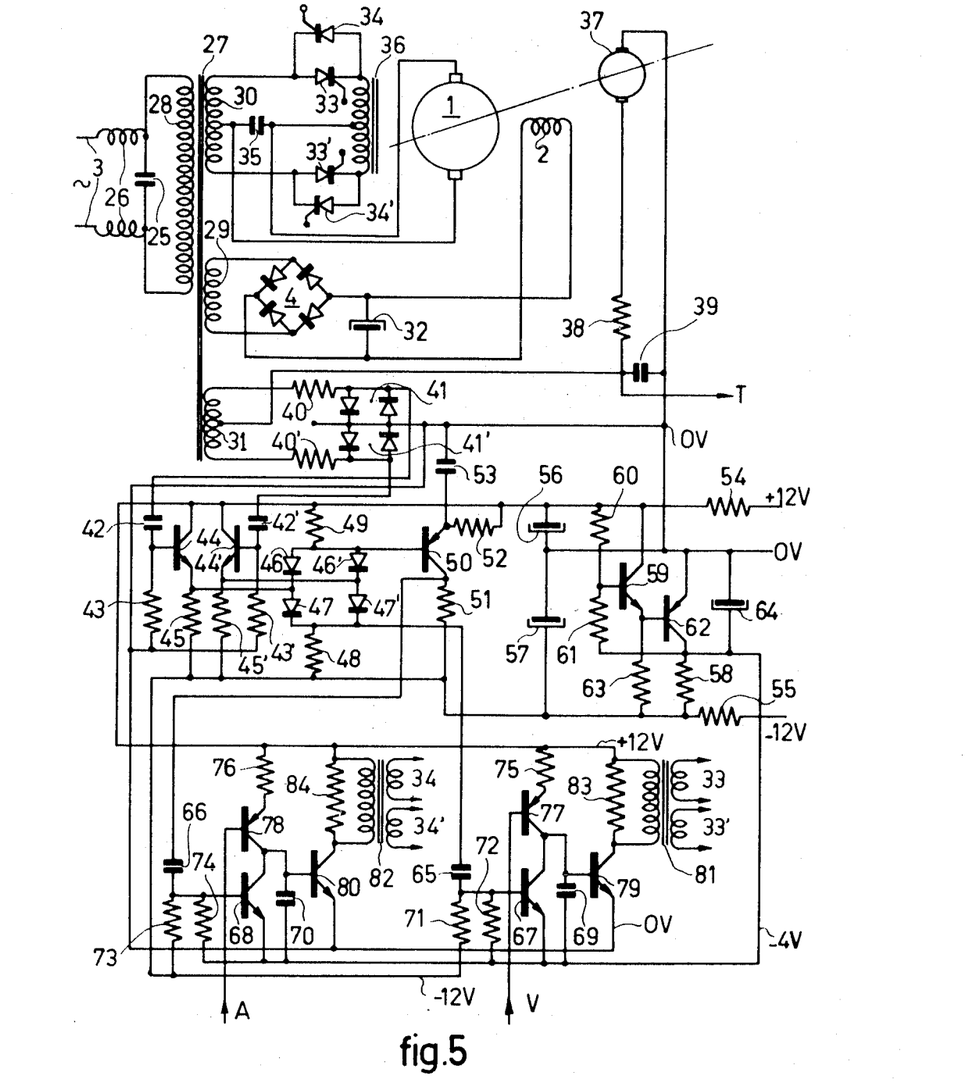
FIG. 5 shows the circuit diagram of a second embodiment for controlling a commutator servomotor the direction of rotation of which can be reversed by reversing the direction of its rotor current.

In the second embodiment shown in FIG. 5, the servomotor 1,2 is fed under the control of a control signal so that it can rotate in two opposite directions and, when the arrangement is switched into circuit and the controlled rectifier is periodically ignited, can also be stationary and then produces a driving, braking or holding torque which is substantially independent of the counter e.m.f. appearing across the rotor 1.

The motor 1,2 is fed by an alternating-voltage source 3 through a low-pass filter comprising a parallel capacitor 25 and series high-frequency choke coils 26 (which prevents the switching pulses form getting into the supply source 3) and through a transformer 27 having a primary 28 and three secondaries 29,30 and 31. The winding 29 feeds the energizing winding 2 shunted by an electrolytic capacitor 32 through the bridge rectifier 4. The winding 30 is provided with a center tapping and feeds the rotor 1 via a double rectifier comprising controlled rectifiers 33 and 33' for one direction and controlled rectifiers 34 and 34' for the opposite direction of rotation. The rotor 1 is shunted by a capacitor 35 and is connected on the one hand to the center tapping on the winding 30 and on the other hand to the center tapping on a choke coil 36. The output terminals of coil 36 are connected to the cathode of the rectifier 33 and the anode of the rectifier 34 and to the cathode of the rectifier 33' and the anode of the rectifier 34', respectively.

Such a supply circuit is known, for example, from pages 140 and 141 and FIG. 8.29 of the "SCR-manual" of "General Electric," third edition. In this case, the capacitor 35 and the choke 36 serve to limit the differential peaks dV/dt which occur upon the ignition of the rectifiers 33,34 of one pair of controlled rectifiers and which are applied across the rectifiers 33', 34' of the other pair. In the present case, however, the inductance of the choke 36 is chosen to be so large that the winding 30 is prevented from being short circuited even if two controlled rectifiers of different pairs, for example, 33 and 34' or 34 and 33', are conducting simultaneously. Thus, a so-called "dynamic stationary state" can be attained in which all the controlled rectifiers 33, 33', 34 and 34' are alternately ignited, the rectifiers 33 and 34' at a first instant, for example, 135° after the upper terminal of the winding 30 has become positive, and the rectifiers 34 and 33' at a second instant, likewise 135° after the lower terminal of the winding 30 has become positive relative to its center tapping. The current through the rotor 1 and the voltage across the capacitor 35 remain equal to zero, however, as long as the rotor 1 is stationary. This mode of operation is known, for example, from "Brown Boveri Mitteilungen" of Aug. 1967, Vol. 54, pages 503 to 510 and in particular pages 507 to 510. When the control is such that the supply arrangement has the character of a voltage source, the linearity of the curve representing the speed of rotation as a function of the control voltage is improved.

The third secondary 31 is also provided with a center tapping and supplies a voltage which is proportional to and in phase with the voltage across the winding 30 and is superimposed on a voltage proportional to the counter e.m.f. produced across the rotor 1. This voltage proportional to the counter e.m.f. is produced by a tachogenerator 37 which is driven by the motor 1,2 and whose output terminals are connected through a resistor 38 to a smoothing capacitor 39 one of the electrodes of which is connected to the center tapping on the winding 31.

The circuit comprising the elements 31 and 37 to 39 is analogous to the rotor circuit 30,1,35. It supplies between each end of the winding 31 and the right-hand electrode of the capacitor 39 a voltage $V_{31}'$ proportional to the voltage supplied by the winding 30 through the controlled rectifiers 33,34 and 33', 34', respectively, and the choke 36 to the rotor 1. This voltage is superimposed on a direct voltage $V_{39}$ which is proportional to the counter e.m.f. produced across the rotor 1 and which thus also increases proportionally with the speed of the rotor 1 and changes its sign with the direction of rotation of this rotor.

Figure 7:
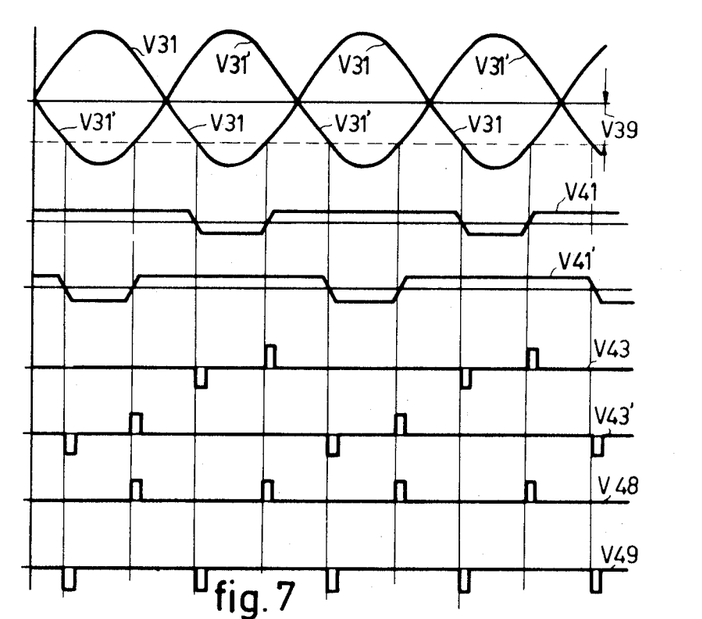

The upper line of FIG. 7 shows the voltage $V_{31}$, $V_{31}'$ and $V_{39}$. Each of the alternating voltage $V_{31}-V_{39}$ and $V_{31}'-V_{39}$ is applied through resistors 40 and 40', respectively, to a double voltage difference limiter 41 and 41', respectively, comprising two diodes connected in parallel opposition. Thus, a trapezoidal voltage $V_{41}$ and $V_{41}'$, respectively, is produced across each of these limiters, as represented on the second and third lines of FIG. 7. Each of these voltages is differentiated by means of a differentiating circuit comprising a series capacitor 42 and 42', respectively, and a parallel resistor 43 and 43', respectively. The fourth and fifth lines of FIG. 7 illustrate the main voltage pulses produced as a result of this differentiation across the resistors 43 and 43'. These pulses are applied through an emitter follower stage comprising a transistor 44 and 44', respectively, and a resistor 45 and 45', respectively, to a double gate comprising diodes 46,47, and 46',47', respectively. The negative pulses of the pulse sequences $V_{43}$ and $V_{43}'$ are applied through the diodes 46 and 46' to a resistor 49 (last line of FIG. 7), while the positive pulses of these two pulse sequences are applied through the diodes 47 and 47' to a resistor 48 (the last line but one of FIG. 7). The negative pulses are applied to the base of a PNP-type transistor 50 in grounded emitter arrangement which produces across its collector resistor 51 a corresponding sequence of positive pulses.

The emitter of the transistor 50 is connected to a supply voltage lead of +12 V through a resistor 52 reducing its amplification and to the zero voltage point through a decoupling capacitor 53. The collector resistor 51 is connected to a supply voltage lead of −12 V. The leads of +12 V and −12 V are connected to corresponding voltage sources (not shown) through resistors 54 and 55 and are decoupled with respect to the zero voltage point and to a corresponding voltage lead of O V through electrolytic capacitors 56 and 57. A fourth lead having a nominal voltage of −4 V is supplied from the lead of −12 V through a resistor 58 and its voltage relative to the +12 V-lead is kept constant by means of a parallel stabilizer having an NPN-type transistor 59 the base of which is connected to the tapping on a potentiometer 60,61 and an NPN-type transistor 62 controlled by the latter. The potentiometer 60,61 is included between the leads of +12 V and of −4 V. The collector of the transistor 59 is connected to the +12 V-lead and its emitter is connected to the base of transistor 62 and through a resistor 63 to the −12 V lead. The emitter-collector path of the transistor 62 is connected between the leads of O V and of −4 V in parallel with an electrolytic capacitor 64. If the voltage between the leads of +12 V and of −4 V increases, the combination of transistors abruptly becomes more heavily conducting and reduces this voltage to the adjusted value of, for example, 16 V.

The positive pulses $V_{48}$ and the inverted pulses $V_{49}$ from the comparison circuit are applied through capacitors 65 and 66, respectively, to the base electrodes of normally conducting short circuit NPN-type transistors 67 and 68, respectively. The emitter-collector path of each of these transistors shunts a capacitor 69 and 70, respectively, of one of two separate time-measuring circuits and its base is polarized in backward direction with respect to its emitter by means of a potentiometer 71, 72 and 73, 74, respectively, connected between the leads of $-12$ V and of $-4$ V.

Each time-measuring circuit comprises, besides the capacitor 69 and 70, respectively, connected to the lead of $-4$ V, a resistor 75 and 76, respectively, connected in series with the emitter-collector path of a PNP-type transistor 77 and 78, respectively, through which series-combinations each of these capacitors is charged from the lead of $+12$ V.

Upon receipt of each positive pulse $V_{48}$ and each inverted pulse $V_{49}$, respectively, the capacitors 69 nd 70, respectively, are discharged through the transistors 67 and 68, respectively, and are then immediately recharged through the resistors 75 and 76, respectively, and the transistors 77 and 78, respectively. The slope of the charging curve of each capacitor and hence the delay time produced by the corresponding time measuring device is controlled by changing the conductivity type of the transistor 77 and 78, respectively, by reversal of the polarization of its base relative to the lead of $+12$ V (as will be set out below) by means of a control arrangement shown diagrammatically in FIG. 6.

If the voltage across the capacitors 69 and 70, respectively, exceeds that between the leads of $-4$ V and of 0 V, an NPN-type transistor 79 and 80, respectively, becomes conducting. The base of each of these transistors is connected to the junction of the capacitors 69 and 70, respectively, and of its charging circuit. Its emitter is connected to the 0 V-lead and its collector is fed from the lead $+12$ V through the primary of a pulse transformer 81 and 82, respectively, connected in parallel with a damping resistor 83 and 84, respectively. Each time the transistor 79 and 80, respectively, becomes conducting, a pulse is thus produced across one of the secondaries of the corresponding pulse transformers 81 and 82, respectively. The pulses from the transformer 81 serve to ignite the controlled rectifiers 33 and 33' and those from the transformer 82 serve to ignite the controlled rectifiers 34 and 34'.

The arrangement described hitherto can be provided with various additional stages, as a result of which the sensitivity, the insensitivity to parasitic voltages and/or current peaks and the ignition of the controlled rectifiers can be improved. For example, a noninverting amplifier may be included between the resistor 48 and the capacitor 65 and each of the PNP-type transistors 77 and 78 may be controlled by means of a PNP-type transistor in grounded collector arrangement so that the effect of temperature on the conductivity of the transistors 77 and 78 is cancelled by the effect of said temperature on the conductivity of these emitter followers. Each of the NPN-type transistors 79 and 80 may be replaced by an odd number of cascaded NPN-type transistors in grounded emitter arrangement, as a result of which the shape and the amplitude of the current pulses from the corresponding pulse transformers 81 and 82 are improved. Moreover a monostable trigger circuit may be connected between each of these cascade arrangements and the relevant pulse transformer in order to produce stronger ignition pulses of a given duration. The operation of the circuit arrangement can be described more readily, however, with reference to the simplified circuit diagram shown.

Figure 6:
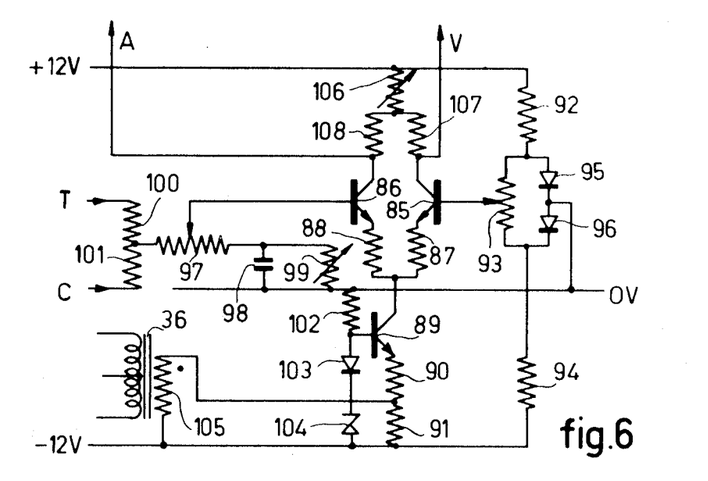
FIG. 6 shows the circuit diagram of a control device for use in the embodiment of FIG. 5, and FIGS. 7 and 8 show voltage-time diagrams for explaining the operation of this embodiment.

The control arrangement of FIG. 6 comprises a differential amplifier having two NPN-type transistors 85 and 86, the emitters of which are connected to the lead of $-12$ V through separate resistors 87 and 88, respectively, the collector-emitter path of a third NPN-type transistor 89 and two further common resistors 90 and 91. The base of transistor 85 is connected to the variable tapping on a resistor 93 of a potentiometer comprising resistor 93 and two further identical resistors 92 and 94 connected between the leads of $+12$ V and $-12$ V. The resistor 93 is shunted by the series-combination of two diodes 95 and 96 which are polarized in the forward direction and the junction of which is connected to the lead of 0 V so that the potential of this lead and the adjustable potential of the base of the transistor 85 relative to the leads of $+12$ V and of $-12$ V are determined by the potentiometers 92,94 and 92,93,94, respectively. The base of the transistor 86 is connected to the variable tapping on an input resistor 97 of a proportional integrating network comprising an integration capacitor 98 included between the resistor 97 and the lead of 0 V and shunted by a variable resistor 99. On the one hand the smoothed voltage T of the tachogenerator 37, produced across the capacitor 39 of FIG. 5, is applied through a resistor 100, and on the other hand a control voltage C is applied through a resistor 101, to the end of the resistor 97 not connected to the integration capacitor 98.

The base of transistor 89 is connected to the tapping on a potentiometer included between the leads 0 V and of $-12$ V. The potentiometer branch adjoining the 0 V-lead comprises a resistor 102 and the other branch comprises a forwardly polarized diode 103 connected in series with a Zener diode 104. As a result of this connection the potential of the base of the transistor 89 and hence also its emitter potential are stabilized with respect to the lead of $-12$ V.

The major part of the emitter resistance of the transistor 89, constituted by the resistor 91, is shunted by a resistor 105 having a very pronounced positive temperature coefficient. Resistor 105 is arranged on the choke 36 (FIG. 5) so as to be in intimate thermal contact with the winding and, as the case may be, also with the core of ferromagnetic material of this choke. Finally, the collectors of the transistors 85 and 86 are fed from the lead of $+12$ V through a common variable resistor 106 and separate load resistors 107 and 108. The collector of the transistor 85 is connected to the base of transistor 77 of FIG. 5 through a lead V (forwards) and the collector of the transistor 86 is connected to the base of transistor 78 of FIG. 5 through a lead A (backwards).

By means of the control arrangement of FIG. 6, a so-called proportional integrating and differentiating control can be attained. In actual fact, the arrangement responds to any difference between the speed of rotation prescribed by the control voltage C and the voltage T which is produced by the tachogenerator 37. The voltage 2 is proportional to the speed of rotation of the rotor 1 and changes its sign with the direction of rotation of this rotor. This voltage is also proportional to the counter e.m.f. produced by the rotating rotor 1. The integrating part can be varied by the variable resistor 99 and the sensitivity or degree of amplification can be adjusted by displacing the tapping on the resistor 97. A variation of the value of the resistor 106 involves a variation of the mean ignition angle for all the controlled rectifiers corresponding to the stationary state. And finally the slidable tapping on the resistor 93 serves to attain the symmetry of the outputs of the stage comprising the transistors 85 and 86: when voltage T is equal to voltage C, the output voltage $V_A$ of the lead A should be equal to the output voltage $V_V$ of the lead V.

If, for example, when the rotor 1 is stationary, a forward speed of rotation $n_1$ is prescribed by a negative control voltage $C_1$, the transistor 86 becomes less heavily conducting and the transistor 85 becomes more heavily conducting, since $I_{c85} + I_{c86} = I_{c89} =$ a constant.

As a result, the transistor 77 of the "forward" time-measuring circuit becomes more heavily conducting and reduces the delay in ignition of the controlled rectifiers 33 and 33' from a mean value $\theta_0$ to a value $\theta_V$, whereas the transistor 78 of the "backward" time-measuring circuit is less heavily conducting and raises the delay in ignition of the controlled rectifiers 34 and 34' from $\theta_3$ to a higher value $\theta_{21}$. Consequently, a current having an effective value which is proportional to $\Delta\theta = \Delta\alpha = \theta_{21} - \theta_V$, (left-hand diagram of the lower line of FIG. 8) starts to flow through the circuit of the rotor substantially immediately. This current drives the rotor 1 in the forward direction so that the tachogenerator 37 produces a positive voltage $T_1$ across the capacitor 39. Due to this voltage, the "forward" reference instant VR and hence for the time being also the ignition instant VO of the controlled rectifiers 33 and 33' are shifted in the forward direction and at the same time the "backward" reference instant AR and the ignition instant AO of the controlled rectifiers 34 and 34' are shifted in the backward direction. The extinction instants of these controlled rectifiers are then advanced and delayed with respect to the reference instants VR and AR, respectively, by the same angles, as represented by the second diagram from the left on the second line of FIG. 8.

After a delay determined by the time constant of the integrating differential network 100, 101, 97, 98, 99, the voltage $T_1$ also reduces the original effect of the control voltage C so that the speed of rotation of the rotor 1 is stabilized at a value corresponding to this voltage, since at T=C, the output voltage $V_V$ and $V_A$ of the control arrangement (FIG. 6) are equal to each other and $\Delta\alpha = \Delta\theta$ becomes equal to zero. However, the degree of amplification of the control arrangement is chosen to be so high that a very small difference between the voltages C and T is sufficient to obtain a considerable angular difference $\Delta\alpha$ and hence to pass a sufficient effective current through the circuit of the rotor 1.

Figure 8:
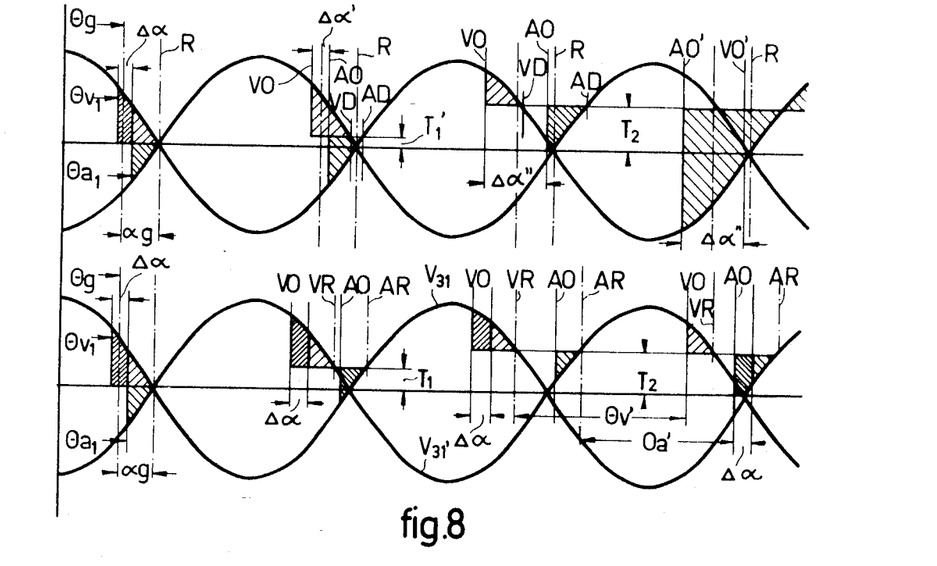

The third diagram from the left on the second line of FIG. 8 represents the operating conditions at the same effective conduction angle $\Delta\alpha$ corresponding to a normal load of about one-sixth of the maximum torque to be attained with the arrangement and at a speed of rotation $n_2$ equal to half of the maximum attainable speed $n_{max}$ and to twice the speed $n_1$. It can be seen that the effective driving current, which is substantially proportional to the voltage-time integral, has decreased only slightly during the time interval when compared with the current in the first two diagrams from the left. The arrangement thus has a pronounced current-source character. In the case of a purely ohmic load having a resistance $r$, the energy P supplied thereto could be expressed by the equation:

$$P = \frac{\pi^2 \widehat{V}^2}{4r}\left[\left(a_g + \frac{1}{2}\Delta\alpha\right)^2 - \left(a_g - \frac{1}{2}\Delta\alpha\right)^2\right]$$

where $\widehat{V}$ represents the peak value of the supply voltage. It will be seen that P is independent of the reverse voltage produced across the load and hence of the tachogenerator voltage T, which holds with close approximation within the range in which $\sin\alpha \approx \alpha$.

At a higher value of T, P becomes equal to 0 if, despite the unchanged $\Delta\alpha$ and due to the sinusoidal supply voltage, the voltage-time integral between the instants VO and VR becomes equal to the voltage-time integral between the instants AO AND AR.

When $\Delta\alpha$ is limited to a safe value, which can be achieved in a simple manner in the control arrangement of FIG. 6 itself or at a point between this control arrangement and the arrangement of FIG. 5, the load, for example, the DC motor 1, 2, is fully protected from excess currents.

Finally, the right-hand diagram on the second line of FIG. 8 represents the conditions obtained when the polarity of the control voltage C is abruptly reversed which is the prescribed condition for reversal of the direction of rotation of the rotor 1. The integrating network absorbs and suppresses the commutation peak so that the absolute value of the voltage applied to the base of the transistor 86 does not exceed that of the original control voltage. For the time being, the tachogenerator voltage and hence also the reference instants VR and AR remain unchanged. The respective values of the output voltages $V_V$ and $V_A$ of the control arrangement are interchanged, however, so that the delay in ignition $\theta_v'$ of the controlled rectifiers 33 and 33' is now equal to the delay in ignition $\theta_n'$ of the rectifiers 34 and 34', and conversely, so that the latter rectifiers pass current pulses whose duration exceeds that of the current pulses passed by the rectifiers 33 and 33' by an angle $\Delta\alpha$. The integral of the current flowing during the substantially unchanged time interval $\Delta\alpha$ in the reverse direction through the rotor 1 hardly exceeds that of the forward current during the time interval $\Delta\alpha$ of the third diagram from the left on the second line of FIG. 8 and cannot at any instant and under any conditions become larger than during the starting operation (first diagram from the left on the second line of FIG. 8). This comparatively small variation of the effective value of the forward or backward current pulses, even with an abrupt reversal of the polarity of the control voltage C, is again due to the current-source character of the arrangement.

From comparison, the first line of FIG. 8 illustrates the conditions obtained in a known arrangement described, for example, in FIG. 8.29 of the G.E. "SCR manual," third edition, described above, but with the use of choke coils of higher value. The sole difference between the two arrangements is that in the known arrangement, the reference instant remains unchanged and does not shift in the forward direction with an increasing reverse voltage, as distinct from tee reference instant VR corresponding to the direction of rotation prescribed, and that it is located at the zero passage of the supply voltage or of the voltage $V_{31}$ proportional and cophasal thereto. For this purpose, it would be sufficient to connect the tapping on the winding 31 to the lead of 0 V instead of connecting it to the left-hand terminal of the capacitor.

When the rotor 1 is in the stationary state, the diagram is identical to that on the second line (first diagram from the left).

Even with a very low reverse voltage $T_1'$, the effective forward current flowing between the ignition instants VO and AO of the controlled rectifiers 33, 33' and 34, 34' has considerably decreased, even during the slightly larger time interval $\Delta\alpha$. The time integral of the voltage between the instant AO and the instant AD at which the rectifiers 34 and 34' are extinguished is already substantially equal to the corresponding time integral between the ignition and extinction instants of the rectifiers 33 and 33', as represented by the second diagram from the left.

At a reverse voltage $T_2$ equal to that of the third and fourth diagrams from the left on the second line of FIG. 8, with the known arrangement the time interval $\Delta\alpha''$ has become considerably larger (almost four times larger) (third diagram from the left of the first line). All the same, the voltage-time integral between the instants VO and VD has become slightly smaller than the corresponding integral for the backward direction between the instants AO and AD due to the sinusoidal shape of the supply voltage. The energy P supplied to a purely ohmic load having a resistance $r$ could now be expressed by the equation:

$$P = \frac{\pi^2 V^2}{4r}\left(a_g + \frac{1}{2}\Delta\alpha - T\right)^2 - \left(a_g - \frac{1}{2}\Delta\alpha + T\right)^2$$

and becomes equal to zero if $T = \frac{1}{2}\Delta\alpha$.

Thus such known arrangements all have the character of a voltage source and cannot operate at a high reverse voltage without also making $\Delta\alpha$ large.

With an abrupt reversal of the polarity of the control voltage (right-hand diagram on the first line of FIG. 8), the time interval $\Delta\alpha''$ again remains substantially unchanged. The rectifiers 34 and 34' ignite at a considerably earlier instant, however, which substantially corresponds to the ignition instant VO of the rectifiers 33 and 33' of the preceding diagram. The latter rectifiers receive ignition pulses at an instant VO' at which they can no longer ignite owing to the reverse voltage across the rotor 1. Consequently, an extremely large current starts to flow through the rectifiers 34 and 34'. The inductive character of the load constituted by the rotor 1 and the choke coil 36 may give rise to a situation in which the rectifiers 34 and/or 34' do not extinguish and the arrangement passes to a subsequent period with at least one conducting controlled rectifier. In the meantime, the conditions for igniting the rectifiers 33 and/or 33' may be fulfilled so that there is a large risk of at least one pair of controlled rectifiers being damaged due to a short circuit. Therefore, some means of current limitation is often provided in known arrangements of this type, for example, as described in the aforementioned "Brown Boveri Mitteilungen."

In the embodiment described with reference to FIGS. 5 to 8, the ratio between the counter e.m.f. N produced across the rotor 1 and the tachogenerator voltage T proportional thereto can be freely chosen by a suitable proportioning of the tachogenerator and/or by means of a potentiometer connected thereto. Furthermore, the ratio between the voltage $V_{31}$ across the winding 31 and the supply voltage $V_{30}$ can also be freely chosen. If, for example, $V_{31}/V_{30}=1$ and T<N, the current-source character of the arrangement becomes less pronounced. If, however, T=N and $V_{31}<V_{30}$, the current-source character described becomes even more pronounced. Under certain conditions, the arrangement has the character of a current source having a negative natural resistance at a counter e.m.f. N=0, which natural resistance becomes positive again at higher counter e.m.f. values. Depending upon the nature and the dimension of the load, the forms $$(V_{31}/V_{30} \cdot T/N < 1 \text{ and } V_{31}/V_{30} \cdot T/N > 1)$$

may both be advantageous.

Alternatively, for example, in the arrangement of FIG. 5, the reference instant chosen could be one of the instants whose phase shifts in the backward direction when the reverse voltage produced across the load increases, as is the case with the known arrangement of FIG. 1 and as shown in FIG. 2 For this purpose, it would be sufficient to interchange connections between the capacitors 65 and 66 and the base electrodes of the transistors 67 and 68. As a result of this and assuming that $V_{31}/V_{30} \cdot {}^{.007\%}N=1$, the arrangement would have the character of a voltage source having a natural resistance which is half the resistance of the case set out with reference to the first line of FIG. 8. The energy P supplied to an ohmic load having a resistance r could then be expressed by:

$$P = \frac{\pi^2 \widehat{V^2}}{4r} \left[ \left( \alpha_R + \frac{1}{2}\Delta\alpha - 2T \right)^2 - \left( \alpha_R - \frac{1}{2}\Delta\alpha + 2T \right)^2 \right]$$

and would become equal to zero if T=Δα/4. As a matter of course, this natural resistance may also be influenced by the choice of the ratio $V_{31}/V_{30} \cdot T/N$. In general, however, such arrangements will have to operate at high reverse voltages and at very large effective conduction angles Δα so that the polarity of the control voltage C cannot be safely reversed without taking special steps. Such arrangements are therefore particularly suitable for feeding ohmic loads, which may generally also be effected by simpler means.

With respect to the relatively cancelling parts VO-Δα-VD and AO-AD of the conduction periods, the choke coil 36 constitutes a comparatively high and substantially purely inductive load $L_{36}$. With respect to the effective current $I_1$ flowing through the rotor 1 during the part Δα of each half cycle, this choke coil constitutes an approximately four times smaller load component $L_{36}/4$ connected in series with the impedance $Z_1$ of the rotor 1. Thus, it is heated mainly by this current $I_1$ and can be used as a thermal simulation of the motor 1,2.

At an excessively high value of the effective conduction angle Δα and/or of the driving, holding or braking torque produced by the motor 1,2, for example, when the rotor 1 is blocked, the winding and/or the core of the choke coil 36 thus also become hot. As a result, the resistance value of the resistor 105 having a positive temperature coefficient strongly increases so that the resistor 91 practically entirely becomes operative in the emitter circuit of the transistor 89. The voltage across this resistor and the resistor 90 connected in series therewith thus becomes substantially equal to the voltage across the diode 103 and the Zener diode 104 at a very low value of the emitter current $I_{89}$ of the transistor 89. The transistors 85 and 86 also are substantially cut off by the increase in potential of their emitters so that the potential applied through the leads A and V to the base electrodes of the transistors 77 and 78 becomes substantially equal to that of the lead of +12 V.

Under these conditions, the transistors 77 and 78 are substantially cut off and the delay times $\theta_{r1}$ and $\theta_1$ become very long and substantially equal to each other so that the controlled rectifiers 33, 33' and 34, 34' no longer ignite.

The arrangement also includes a thermal safety fuse for the motor 1,2, in particular for the circuit of its rotor 1.

Finally, it should be noted that the arrangements described may also be used for the supply of an asynchronous motor. Three arrangements would be required for this purpose, fed and controlled at relative phase differences of ⅔π. The three-phase supply voltage may be supplied, for example, by an AC converter having a variable output frequency so that the speed of rotation of the motor can be controlled by the arrangements by varying this frequency while retaining a substantially constant torque and an automatic current limitation.

What is claimed is:

1. An arrangement for controlling the direct current supplied from an alternating current source to a load across which it produces a reverse voltage comprising, at least one controlled rectifier connected in series with the load across said AC source, a control circuit by means of which the controlled rectifier is ignited during each forward half-cycle of the supply voltage with a controlled delay with respect to a reference instant at which the absolute value of a voltage proportional to said reverse voltage is equal to the instantaneous amplitude of the trailing edge of half a cycle of the supply voltage or of a voltage proportional thereto, so that, within certain limits, the effective current applied to the load is substantially independent of the reverse voltage produced across said load, and wherein said control circuit comprises a time-measuring circuit having a reset switch, the time-measuring circuit producing a pulse for igniting said controlled rectifier with a controlled time delay after the reference instant that is determined by the time-measuring circuit, a comparison circuit, means for applying to said comparison circuit the difference between the supply voltage and the reverse voltage, said comparison circuit including a voltage difference limiter followed by a differentiating circuit which produces pulses whenever the amplitude of the supply voltage is equal to the amplitude of the reverse voltage, and wherein the reset switch is controlled by the pulses derived from the differentiating circuit and is sensitive solely to control signals of a given polarity corresponding to that of the reset pulses corresponding to the reference instant.

2. An arrangement as claimed in claim 1 further comprising a second controlled rectifier for supplying energy to the load, said controlled rectifiers being included in a multiphase rectifier, characterized in that the comparison circuit comprises a number of branches equal to the number of phases, the difference between a corresponding phase of the alternating supply voltage and the reverse voltage being applied to each of said branches, said arrangement including a corresponding number of voltage limiters followed each by a corresponding differentiating circuit for controlling the reset switch of the time-measuring circuit.

3. An arrangement as claimed in claim 2 wherein the load is energized by means of said two controlled rectifiers connected as a full-wave rectifier, characterized in that the pulses produced by the two differentiating circuits are applied to the reset switch of a common time-measuring circuit.

4. An arrangement as claimed in claim 1 for feeding the load with a mean current of reversible direction comprising, a second controlled rectifier connected in circuit with the load and the first controlled rectifier so that there is one controlled rectifier for each current direction, characterized in that it comprises a time-measuring circuit having a reset switch for each current direction, one reset switch being exclusively responsive to the resetting pulses corresponding to the chosen reference instant and the other switch exclusively to the pulses of opposite polarity, and means for adjusting the respective time delays of the two time-measuring circuits differently so that the load is supplied with current pulses the respective durations of which differ from each other by the difference between the respective time delays, the direction of the mean load current then corresponding to the pass direction of the controlled rectifier ignited with the smaller delay.

5. An arrangement as claimed in claim 4 characterized in that it comprises a control circuit for simultaneously varying the time delays of both time-measuring circuits so that one time delay increases by the same amount by which the other decreases and vice versa.

6. An arrangement as claimed in claim 5 characterized in that the control circuit comprises a differential amplifier having two symmetrical outputs and two inputs to which a control voltage and a reference voltage are applied.

7. An arrangement as claimed in claim 5 wherein the load is a motor, said arrangement further comprising a protective circuit connected to the control circuit so that the maximum difference between the time delays of the two time-measuring circuits is reduced when the motor is overloaded.

8. An arrangement as claimed in claim 7 characterized in that the protective circuit is designed so that the time delays of the two time-measuring circuits are made larger than a half-cycle of the supply voltage in the case of motor overload.

9. An arrangement as claimed in claim 4 wherein the load is a commutator motor whose direction of rotation can be reversed by reversal of the direction of the rotor current, characterized in that the arrangement is designed so that the voltage drop across the rectifier circuit for one direction of rotation is equal to that across the rectifier circuit for the opposite direction of rotation, so that, with equal time delays, current pulses of alternating polarities and of equal duration are passed to the motor and the motor does not produce any driving torque at zero reverse voltage.

10. An arrangement as claimed in claim 4 further comprising an inductance connected in series with the controlled rectifiers and having a center tapping to which the load is connected whereby the AC component of the current supplied to the load is suppressed thereby to prevent a short circuit of the alternating voltage source in the event that two controlled rectifiers of opposite polarity are simultaneously conducting.

11. A circuit for supplying a direct current to a load from an alternating current supply source comprising, a controlled rectifier connecting said current source to the load to periodically energize the load during a forward half-cycle of the supply voltage whereby the load is of a type that develops a reverse voltage, and a control circuit coupled to the control electrode of the controlled rectifier to apply time-delayed ignition pulses thereto that control the firing angle of the controlled rectifier, said control circuit including a timing circuit that produces said ignition pulses for control of said firing angle, a reset switch coupled to the timing circuit and controlled by the reverse voltage of the load and the voltage of the supply source for resetting the timing circuit when the reverse voltage is equal to the voltage amplitude of the trailing edge of the forward half-cycle of the supply voltage, an increase in said reverse voltage being operative on said reset switch and in turn the timing circuit to advance the ignition point of the controlled rectifier.

12. A circuit as claimed in claim 11 wherein the load is a motor and the timing circuit includes a resistor and capacitor connected across a source of constant voltage, said circuit further comprising a voltage threshold trigger element coupled between the RC timing circuit and the control electrode of the controlled rectifier.

13. A circuit as claimed in claim 12 further comprising means connecting the reset switch in parallel with the timing capacitor, the reset switch being normally open and being closed upon equality of the reverse voltage and said supply voltage trailing edge to provide a discharge path for the capacitor.

14. A circuit as claimed in claim 11 wherein the timing circuit includes a resistor and a capacitor connected across a source of constant voltage whereby the capacitor charge period is independent of the load reverse voltage.

* * * * *